United States Patent Office 3,479,403
Patented Nov. 18, 1969

3,479,403
CATALYTIC OXIDATIONS WITH RUTHENIUM
Alexander F. MacLean, Corpus Christi, Tex., assignor to Celanese Corporation, New York, N.Y., a corporation of Delaware
No Drawing. Filed Jan. 3, 1966, Ser. No. 517,901
Int. Cl. C07c 51/28, 45/16, 45/04
U.S. Cl. 260—530
8 Claims

ABSTRACT OF THE DISCLOSURE

Disclosed herein is a novel oxidation catalyst. The activity of ruthenium as an oxidation catalyst is enhanced by maintaining the oxidation potential of the ruthenium catalyst at less than the oxidizing potential of Ru(VIII) to greater than that of Ru(IV).

This invention relates to the oxidation of reactive organic compounds using ruthenium as an oxidation catalyst. More particularly, this invention relates to the oxidation of reactive organic compounds using ruthenium as an oxidation catalyst under controlled potential conditions.

There is a great deal of patent literature dealing with the production of carbonyl compounds, such as aldehydes and ketones, from olefinically unsaturated hydrocarbons by contacting the olefin with a metallic catalyst of Group VIII of the Periodic Table in the presence of at least one multivalent metal salt having an oxidation potential higher than that of the Group VIII metal. Such a process is found in U.S. Patent No. 3,080,425. The process according to the above patent oxidizes olefinic compounds without altering the number of carbon atoms present in the molecule. In British Patent No. 900,107 the oxidation of organic compounds such as olefins, cyclic ethers and N-alkyl substituted aliphatic amides to aldehydes, lactones or imides respectively with ruthenium tetroxide is discussed. According to this patent, ruthenium, present as ruthenium trichloride, is oxidized to its highest oxidation state Ru(VIII) as ruthenium tetroxide and the ruthenium tetroxide is used to oxidize various organic compounds.

Unexpectedly it has been found that by carrying out the oxidation of reactive organic compounds such as, for example, olefins, alcohols, ketones and aldehydes, in the presence of ruthenium under controlled electromotive potential oxidation conditions the activity of ruthenium as an oxidation catalyst can be increased by a substantial factor.

In its broadest aspect, this invention comprises contacting a reactive organic compound with ruthenium while maintaining the oxidation potential of the reaction system at a level which will maintain the ruthenium catalyst in an oxidation state less than the highest oxidation state of ruthenium, i.e. as Ru(V), Ru(VI), or Ru(VII).

Ruthenium exists in a great number of oxidation states ranging from Ru$^{-1}$ to Ru(VIII). Under acidic conditions ruthenium becomes a strong oxidant comparable to or more active than ozone or permanganates. Ruthenium exists as ruthenium tetroxide, e.g. Ru(VIII) at oxidation potentials of 1.4 or greater. We have discovered that the lower oxidation states of ruthenium, such as those existing between Ru(IV) and Ru(VIII) and referred to here as "active intermediate states," are much more reactive than is Ru(VIII). Oxidation potentials are given here relative to the hydrogen electrode at a pH of 0.0 unless defined otherwise.

The reactive organic compounds useful in this invention include a wide range of compounds, generally all organic compounds excepting paraffinic hydrocarbons and carboxylic acids. Inclusive of these compounds are cyclic and aliphatic mono- and poly-functional alcohols, ketones, aldehydes, alkyl nitrates, alkyl, aryl, and aralkyl sulfonates and sulfoxides, phenols, olefins, amines, and sulfides. Examples of compounds which may be used include acrolein, allyl alcohol, pentaerythritol, cyclohexanol, cyclohexanone, pinene, oleic acid, ethylene glycol, butylene glycol, glycerine, t-butyl alcohol, dimethyl sulfoxide, ethanol, acetaldehyde, benzoic acid, octene-1, pentene, hexene, heptene, propene, styrene, ethylene and many others.

There appears to be two active states of the ruthenium catalyst: one is RuO$_4$, a yellow volatile compound with a valence state of 8+, and the other, a compound of ruthenium with a valence of 5+, 6+, or 7+ referred to as "active intermediate states." Ruthenium as Ru(III) is a dark brown color. As it is oxidized from Ru(III), its color changes, finally, to a light yellow as Ru(VIII). In the intermediate states ruthenium ranges in color from a dark blue to green.

The amount of ruthenium necessary in the process according to this invention is only that sufficient to catalyze the reaction. It has been found that amounts ranging as low as 10 parts per billion can be used. Generally the ruthenium is present in an amount ranging from $1 \times 10^{-7}$ molar to $1 \times 10^{-3}$ molar. There is no particular advantage in employing greater concentrations of ruthenium although they may be used. The ruthenium is initially introduced, preferably, as a water soluble salt, such as ruthenium (III) chloride. Other ruthenium compounds which may be used include the other halide salts of ruthenium and nitrate salts.

Although ruthenium in its active oxidation state is a desirable agent to oxidize the named organic compounds, the reaction ceases when the ruthenium is reduced. It is thus desirable to provide an oxidizing agent which will oxidize the ruthenium compound to its active state as it is reduced and employ the ruthenium as a catalyst. Ruthenium as Ru(III) is the usual starting material in the process according to this invention. The active intermediate oxidation states of ruthenium are reduced to an insoluble state by the organic compounds. The insoluble state precipitates when the oxidizing agent is all reacted. By controlling the oxidation potential of the reaction system so as to maintain ruthenium in these "active intermediate oxidation states" the reaction rate is substantially increased. The oxidizing agents useful in the process according to this invention are those having oxidation potential sufficient to maintain some of the ruthenium in its active intermediate oxidation state. Generally, oxidizing agents which have oxidation potentials of at least 1.25 volts at a pH of 3.0 are useful in the process according to this invention. The oxidation potentials can be determined in a known manner by electrical measurements. Examples of oxidizing agents which may be used include:

Formal oxidation potentials of oxidizing agents

| | |
|---|---|
| BrO$_3^-$ → Br$^-$ | 1.59 |
| I$_5$IO$_6$ → IO$_3$ | 1.70 |
| O$_2$ → 2H$_2$O | 1.23 |
| IO$_3^-$ → I$^-$ | 1.20 |
| Ce$^{+4}$ → Ce$^{+3}$ | 1.70 |
| ClO$_3^-$ → Cl$^-$ | 1.45 |
| Cl$_2$ → 2Cl$^+$ | 1.35 |

The selection of a suitable oxidizing agent depends upon the desired manner of carrying out the reaction. For example, some oxidizing agents have a potential high enough to be useful according to this invention but the kinetics of the oxidation of lower ruthenium states is unfavorable. In exceptional cases the particular oxidizing agent might react directly with the organic compounds being oxidized rather than with the ruthenium catalyst itself. It is thus desirable to choose an oxidizing agent for the particular reaction system based on such considerations.

The process can be carried out at good yields at temperatures ranging from about 0 to 200° C., preferably between 20° and 70° C. For example, aldehydes are easily oxidized at room temperature while t-butanol requires a higher temperature to effect oxidation. Within the preferred range of temperatures, the selection of the optimum temperature depends upon the concentration of the catalyst solution, the type of oxidizing agent employed, and the compound to be oxidized.

The reaction is preferably carried out in a neutral to acidic medium. The activity of ruthenium in oxidation state below that of $Ru^{+8}$ is a function of the pH. Preferably, the reaction is carried out at a pH ranging from 2 to 4, although a wider pH range from 0 to 7 is applicable. With too low a pH there is danger of the ruthenium catalyst precipitating as $RuO_2$. The effect of increasing acidity is an apparent increase in the reaction rate.

The process may be carried out at atmospheric pressures, subatmospheric pressures, or at superatmospheric pressures, e.g. pressures ranging from 0 to 1500 p.s.i. under oxygen or nitrogen.

The time during which the reactive organic compounds are in contact with the aqueous catalyst solution may range from a few seconds to several hours as the time of contact depends upon the reactivity of the organic compound, the concentration of the catalyst solution, the pressure and temperature, as well as the type of oxidizing agent used. The permissive period of contact can easily be determined for each individual case by determination of the yield obtained.

As has been stated previously only a very minor amount of the catalyst is necessary to the effective operation of the process. In most cases it is sufficient to use a catalyst in which the molar ratio of oxidizing agent to ruthenium ranges from $1\times10^{-6}:1$ to $10:1$. As long as there is sufficient oxidizer present, the reaction proceeds. The oxidizing agent disappears at a constant rate when the rate of oxidation of the organic compound is rate limiting. Its concentration is generally significant above $1\times10^{-3}$ M when used with catalytic amounts of ruthenium. A substantial excess of the compound to be oxidized can be used, the amount of the excess not being critical to the carrying out of this invention.

The reaction is preferably carried out in an aqueous medium. The addition of salts such as sodium chloride, potassium molybdate or potassium tungstate affects the maximum oxidation rate. Sodium chloride appears to enhance the reaction rate. Sodium molybdate and sodium tungstate tend to decrease the reaction rate, probably because of the formation of addition complexes with the ruthenium catalyst.

The regeneration of the oxidizing agent by an economical means is the key to a significant commercial process. Some of the oxidizing agents useful in the process according to this invention can be regenerated by electrochemical oxidation.

The oxidation potential of the reaction system must be controlled in order to maintain the ruthenium in its most active oxidation states below ruthenium tetroxide Ru(VIII). Control of the oxidation potential can be effected in several ways. The rate of addition of oxidizing agent can be used to control the potential of the reaction system. If the addition rate of the oxidizing agent is increased above the level necessary to oxidize ruthenium to its highest oxidation state, the reaction rate decreases abruptly. A platinum electrode may be used as a means of indicating the oxidation potential of the active ruthenium oxidation states present. Other electrodes can also be used such as carbon or lead oxide.

The rate limiting step in the process according to this invention is the oxidation of the reactive organic compound by ruthenium. A series of experiments to determine the rate limiting step were performed in which the ruthenium catalyst and the oxidizing agent were reacted batchwise in aqueous solutions. Ruthenium trichloride and an oxidizing agent were premixed to convert all of the ruthenium to ruthenium tetroxide ($RuO_4$). The organic compound to be oxidized was added in at least a tenfold molar excess over the catalyst. Initially the solution was yellow due to the presence of $RuO_4$. When all of the oxidizing agent was consumed, the solution immediately became dark indicating the reduction of $RuO_4$ to a lower oxidation state. The interval between addition of the organic reducing compounds and the appearance of darker colored products in this "clock reaction" was the reaction time which may be expressed as $$\text{Time (sec)} = \frac{(\text{oxidizing agent})}{K(RuO_4)(\text{reducing comp'd})}$$

Some organic compounds oxidize very slowly and the oxidizing agent must be added slowly to prevent ruthenium tetroxide formation. Others oxidize so rapidly and readily that a rapid addition of oxidizing agent does not cause ruthenium tetroxide formation. The organic compounds react much more readily with the intermediate oxidation state of ruthenium than with ruthenium tetroxide as judged by the speed with which the oxidizing agent can be added. Acetaldehyde, as an example, appeared to react with the intermediate oxidation states of ruthenium at least 10 times as rapidly as with the ruthenium tetroxide. When the oxidizing agent was added rapidly enough to exceed the rate of reduction of the intermediate state, ruthenium tetroxide was formed. When this happened, the rate of oxidation of the acetaldehyde decreased over tenfold.

A simple expression for the reaction system of this invention using isopropanol as the reactive organic compound, ruthenium as the catalyst, and sodium hypochlorite as the oxidizing agent is shown below. It involves four reactions. It is illustrated using Ru(VI) as the intermediate ruthenium state although it could be Ru(V) or Ru(VII)

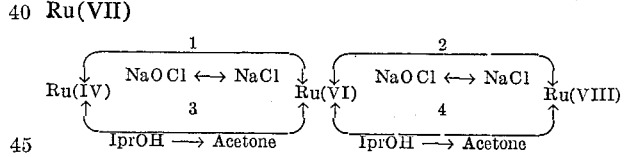

At a high oxidation potential, e.g. greater than 1.35 v., at pH 3.0 the reduction of Ru(VIII) by isopropanol to yield acetone is the rate limiting step (reaction 4). The Ru(VI) is immediately reoxidized and remains at a low concentration relative to Ru(VIII) (reaction 2). When, as in this invention, the oxidation potential is controlled at from 0.1 to 0.3 volts below that of $RuO_4$ (Ru(VIII)) in this system, Ru(VI) becomes the dominant active form. Then the isopropanol oxidation by reaction 3 becomes rate limiting and the Ru(IV) is reoxidized and kept at a low concentration by reaction 1.

The following examples are given as illustrative of the invention, however this invention is not limited to the specific compounds and process conditions used and shown by these examples.

EXAMPLE I

An aqueous solution of 0.10 M calcium hypochlorite was added at 25° C. to a closed system containing 2.0 mm. of ethanol and 0.098 mm. $RuCl_3$ in 25 cc. of water. The calcium hypochlorite was added to the closed system at a rate not sufficient to produce an observable yellowing of the solution, the yellow color indicating the buildup of undesired ruthenium tetroxide. Toward completion of the reaction the oxidizing agent (calcium hypochlorite) was added more slowly. When a trace of yellow finally persisted for a few minutes, sufficient oxidizing agent was added to dispatch the brown color of ruthenium chloride and give only ruthenium tetroxide. The conversion to ruthenium tetroxide was used only as a means of providing an end point for the reaction. The total amount of oxidizing agent consumed in oxidizing the ethanol was calculated by subtracting the amount necessary to oxidize ruthenium chloride to ruthenium tetroxide from the total amounts used. In the oxidation of 2 millimoles of ethanol, a total of 8.1 milliequivalents of oxidizing agent were used. Only 0.5 milliequivalent would be required to oxidize $RuCl_3$ to $RuO_4$, leaving 7.6 milliequivalents used to oxidize the ethanol. Acetic acid was obtained as a product, the theoretical requirement for the conversion of ethanol to acetic acid being 8.0 milliequivalents.

EXAMPLE II

Example I was repeated using 2.0 millimoles of ethylene glycol instead of ethanol. Carbon dioxide was obtained from the reaction and 9.6 milliequivalents of oxidizer was consumed.

EXAMPLE III

Example I was repeated using 6.38 millimoles of octene-1 instead of ethanol and sodium hypochlorite instead of calcium hypochlorite. The reaction was conducted in 300 cc. of 50% t-butanol to solubilize the octene-1 in the aqueous reaction media. Heptanoic acid and formic acid were the major products obtained.

EXAMPLE IV

Example III was repeated using periodic acid ($H_4IO_6$) as the oxidizing agent. The products obtained were heptanoic acid and carbon dioxide. Heptanoic acid was made, according to chromatographic analysis in over 90% efficiency and yield.

FIGURE I describes the reaction rate of isopropanol in the presence of ruthenium and sodium hypochlorite as a function of the potential of the reaction system. The reaction rate increased with increasing potential until it reached a maximum, then the rate declined. At the potential of the maximum rate, the ruthenium catalyst was green due to the active oxidation states of ruthenium between Ru(IV) and Ru(VIII). At the highest potential the less active red-yellow Ru(VIII) appeared and the reaction rate declined. By controlling the oxidation potential of the reaction system so as to maintain the ruthenium catalyst in a state of highest activity, the reaction rate was significantly increased.

A comparison of the rate constants for oxidations with ruthenium tetroxide and ruthenium in an active oxidation state below that of Ru(VIII) are shown below.

TABLE 1

| Compound oxidized | Rate Constant, liters/mol$^{-1}$/sec.$^{-1}$ [2] | |
|---|---|---|
| | $RuO_4$ | $Ru^{x+}$ [1] |
| Acetaldehyde to acetic acid | 7.9×10$^{-1}$ | 1.9. |
| Ethanol to acetic acid | 1.9×10$^{-2}$ | 5.9×10$^{-1}$. |
| Isopropanol to acetone | 2.7×10$^{-2}$ | 2.9×10$^{-1}$. |

[1] $Ru^{x+}$ refers to an active oxidation state of ruthenium where x is less than VIII. $Ru^{x+}$ oxidations performed at pH=4.6.

[2] $k(RuO_4) = \dfrac{\text{Reaction rate (moles/liter/sec.)}}{\text{Conc. } RuO_4 \times \text{conc. organic}}$ $k(Ru^{x+}) = \dfrac{\text{Reaction rate at controlled potential}}{\text{Conc. } RuO_4 \times \text{conc. organic}}$

EXAMPLE VI

The oxidation of other organic compounds under controlled potential conditions as described in Example V were carried out at 30° C., as shown by Table II.

TABLE II

| Compound | Compound m./l. | Oxidation agent | Total oxidizer, m./l. | $RuCl_3$, m./l. | Potential volts vs. S.C.E. | pH | Reaction rate, moles/ liter/sec. |
|---|---|---|---|---|---|---|---|
| Isopropanol to acetone | 0.10 | NaOCl | 5.6×10$^{-4}$ | 1.0×10$^{-4}$ | 0.78 | 4.6 | 29×10$^{-6}$ |
| Acetaldehyde to acetic acid | 0.10 | NaOCl | 2.8×10$^{-4}$ | 2.8×10$^{-4}$ | 0.80 | 4.6 | 1.9×10$^{-6}$ |
| Acetaldehyde to acetic acid | 0.10 | $H_5IO_6$ | 13×10$^{-4}$ | 0.1×10$^{-4}$ | 0.73 | 4.6 | 9.3×10$^{-6}$ |
| Allyl alcohol to acrolein and acrylic acid | 0.08 | $H_5IO_6$ | 13×10$^{-4}$ | 0.1×10$^{-4}$ | 0.65 | 4.6 | 28×10$^{-6}$ |
| Ethanol to acetic acid | 0.04 | $H_4IO_6$ | | 0.8×10$^{-4}$ | 0.71 | 4.6 | 1.9×10$^{-6}$ |
| Dimethylketone to acetic acid | 5.0 | $H_5IO_6$ | | 0.8×10$^{-4}$ | 0.84 | 4.6 | 0.26×10$^{-6}$ |

EXAMPLE V

In order to carry out the process according to this invention with ruthenium in its most active states a method was devised whereby the potential of the reaction system could be closely controlled. A platinum electrode was used to measure the oxidation potential of the oxidizing agents or the oxidation potential of the active ruthenium catalyst oxidation states present. A reactor was fitted with a magnetic stirrer and stirring bar, a calomel electrode, a 0.1 mm. platinum wire and a hydrogen electrode. A buffer of acetic acid and sodium acetate having a pH of 3.2 was added to the reactor and to this a solution of $RuCl_3$ and the isopropanol to be oxidized were added. The $RuCl_3$ catalyst was present in a concentration of 0.08×10$^{-4}$ M and the isopropanol present in a concentration of 0.04 M. A measured amount of oxidizer, sodium hypochlorite, was added to the reaction mixture causing an abrupt increase in the desired potential on the platinum electrode. The oxidizer was then added slowly to maintain the desired potential. At potential of 1.02 volts relative to the calomel electrode, the reaction rate expressed in moles liter$^{-1}$ sec.$^{-1}$ of oxidizer was 6.7×10$^{-6}$. When the potential of the reaction system was increased to 1.06 volts relative to the calomel electrode a potential where the ruthenium is present as $RuO_4$, the reaction rate decreased to 0.19×10$^{-6}$ moles liter$^{-1}$ sec.$^{-1}$, a decrease of over 35 times, thus indicating the activity of the intermediate oxidation states of ruthenium.

Oxidations which can be carried out by the methods described include the oxidation of acrolein or allyl alcohol to acrylic acid, pentaerythritol to trimethylolacetic acid, cyclohexene to adipic acid, and cyclohexane to adipaldehyde.

The embodiments of the invention in which an exclusive property or privilege is claimed are defined as follows:

1. In a method for the oxidation of a reactive organic compound selected from the group consisting of olefins, alcohols, ketones, and aldehydes, which process comprises contacting the organic compound in a neutral to acidic medium with a ruthenium catalyst at a temperature ranging from 0 to 200° C., the improvement which comprises:

incorporating an oxidizing agent into said medium at a rate sufficient to maintain the oxidation potential of said ruthenium above that of Ru(IV) but at least 0.1 volt below that of Ru(VIII), said oxidizing agent being a compound which is capable of oxidizing Ru(III) to Ru(V), Ru(VI), or Ru(VII) and which has a formal oxidation potential of at least 1.2 volts at a pH of 3.0.

2. A method according to claim 1 wherein the ruthenium catalyst is maintained in the desired state of oxidation by measuring the oxidation potential of the reaction mixture during the oxidation reaction and, whenever said measurement indicates that said oxidation potential is approaching that of Ru(VI), adding the oxidizing agent to the reaction mixture in a quantity sufficient to increase the oxidation potential of the ruthenium catalyst above that of Ru(IV).

3. The method according to claim 1 wherein the oxidizing agent is one having an oxidation potential between about 1.2 volts and about 1.7 volts.

4. The method according to claim 3 wherein the ruthenium catalyst is maintained at an oxidation potential of 0.1 to 0.5 volts below the oxidation potential of ruthenium (VIII).

5. The method according to claim 4 wherein the reaction medium is maintained at a pH from 0 to 7.

6. The method according to claim 5 wherein the ruthenium catalyst is present in an amount ranging from $1 \times 10^{-7}$ to $1 \times 10^{-3}$ M.

7. Method according to claim 6 wherein the oxidation is carried out in an aqueous medium.

8. Method according to claim 7 wherein the oxidation is carried out at a pressure ranging from 0 to 1500 p.s.i.

References Cited

UNITED STATES PATENTS

| | | | |
|---|---|---|---|
| 3,214,357 | 10/1965 | Holt et al. | 260—596 |
| 3,306,930 | 2/1967 | Copelin et al. | 260—530 |

LORRAINE A. WEINBERGER, Primary Examiner

D. STENZEL, Assistant Examiner

U.S. Cl. X.R.

260—524, 531, 533, 537, 596, 604

UNITED STATES PATENT OFFICE
CERTIFICATE OF CORRECTION

Patent No. 3,479,403                      November 18, 1969

Alexander F. Mac Lean

It is certified that error appears in the above identified patent and that said Letters Patent are hereby corrected as shown below:

Column 2, line 58, "$I_5IO_6$" should read -- $H_5IO_6$ --. Column 6, line 51, "cyclohexene" should read -- cyclohexanone --.

Signed and sealed this 2nd day of March 1971.

(SEAL)
Attest:

Edward M. Fletcher, Jr.                        WILLIAM E. SCHUYLER, JR.
Attesting Officer                               Commissioner of Patents